United States Patent [19]

Massarsky

[11] Patent Number: 5,184,160
[45] Date of Patent: Feb. 2, 1993

[54] CAMERA POSITION ADJUSTMENT DEVICE

[75] Inventor: Yefim Massarsky, Newton, Mass.

[73] Assignee: Foto Fantasy, Inc., Newton, Mass.

[21] Appl. No.: 672,369

[22] Filed: Mar. 20, 1991

[51] Int. Cl.$^5$ ............................................. G03B 15/06
[52] U.S. Cl. ....................................... 354/76; 354/290
[58] Field of Search ....................... 358/93, 909; 354/76, 354/290

[56] References Cited

U.S. PATENT DOCUMENTS

| | | | |
|---|---|---|---|
| 2,176,573 | 10/1939 | Hershberg | 354/290 |
| 2,386,276 | 10/1945 | Simjian | 354/290 |
| 4,804,983 | 2/1989 | Thayer, Jr. | 354/290 |
| 4,888,606 | 12/1989 | Ota et al. | 354/290 |
| 5,023,638 | 6/1991 | Siegesleuthner et al. | 354/290 |

Primary Examiner—Michael L. Gellner
Assistant Examiner—David M. Gray
Attorney, Agent, or Firm—Iandiorio & Dingman

[57] ABSTRACT

A mechanical camera position adjustment device that allows a user to adjust the relative position of a photography-booth camera to alter the position of the user's image in the camera's field of view, including a camera mount for providing horizontal and/or vertical camera movement, a remote camera adjustment device operable by the user to move the camera, and a mechanical linkage between the adjustment mechanism and the camera mount for directly translating user adjustment device operation into camera movement to allow the user to directly control the camera position.

15 Claims, 6 Drawing Sheets

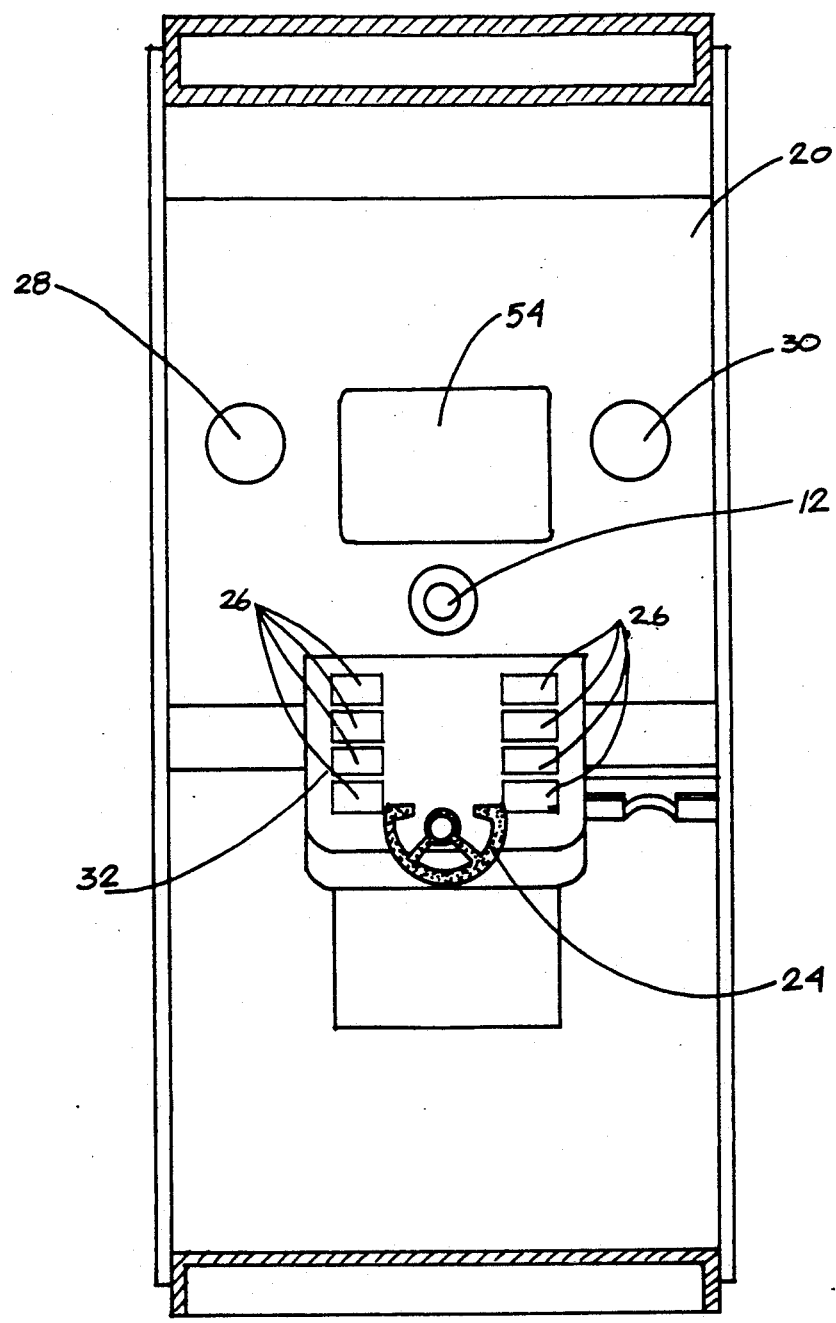

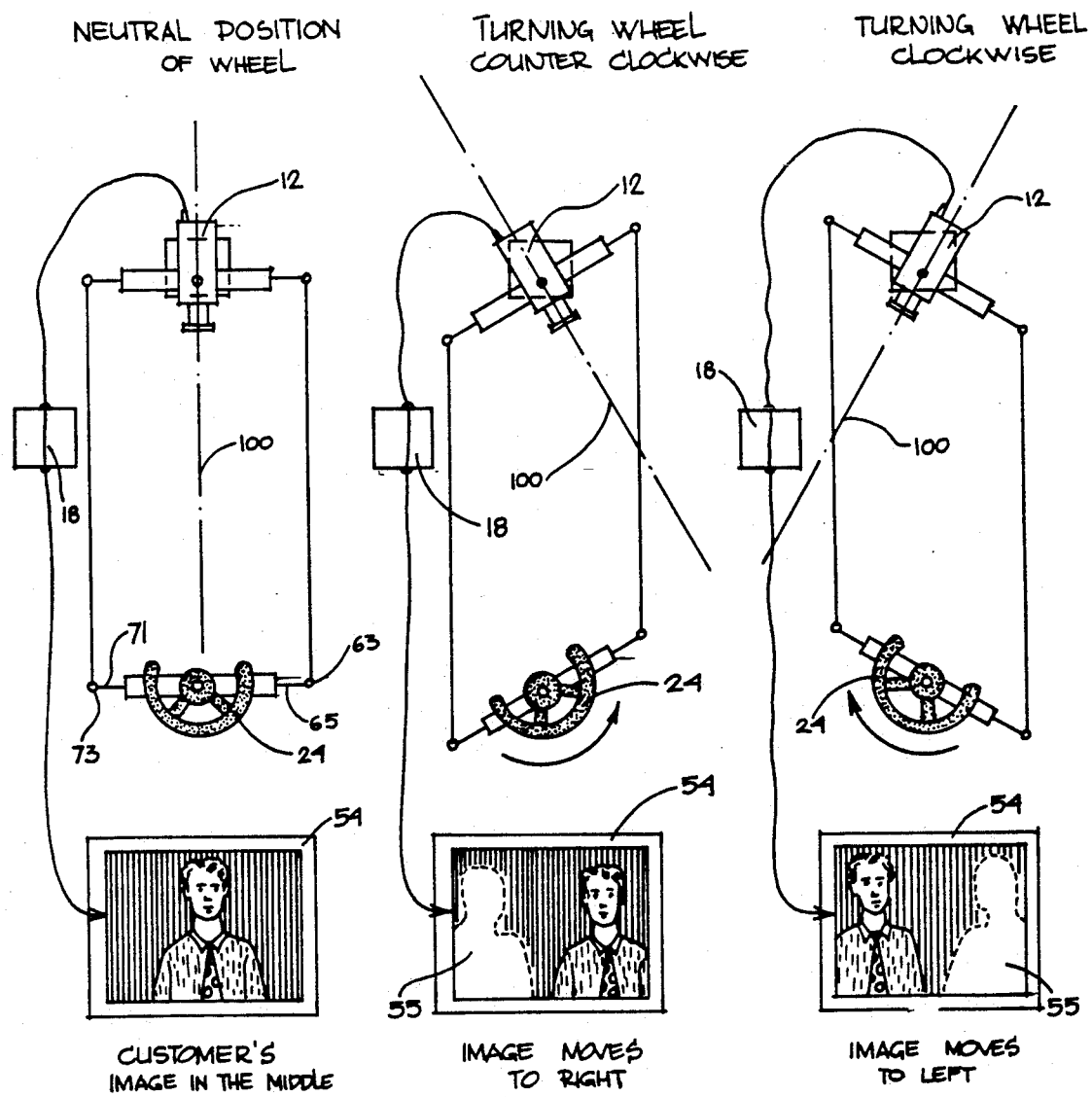

(A) WHEEL FORWARD IMAGE DOWN (B) WHEEL IN MIDDLE (C) WHEEL BACK IMAGE UP

CAMERA POSITION ADJUSTMENT DEVICE

FIELD OF INVENTION

This invention relates to a mechanical linkage system for allowing a user to remotely directly control the position of a camera to place his image where desired in the camera's field of view.

BACKGROUND OF INVENTION

Self-service photography booths typically have a still or video camera mounted in a booth wall opposite the user's seat. In some such systems, the wall with the camera mounted therein also has a video monitor for displaying the camera's image. The user is typically given a certain amount of time to position himself where desired within the camera's field of view before the image is captured and printed. Often, the user sits on a bench, and if he needs to change the position of his image in the camera's field of view, he must shift his position up or down or side to side on the bench. Some such booths may have an adjustable height seat that gives the user some control over the height of his image in the field of view.

In one such system the platform to which the camera is mounted may be tipped on a horizontal axis by use of a motor-driven camera-mount platform to change the vertical field of view of the camera. This system provides adjustment only in the vertical direction and so does not allow the user to place his image exactly where desired anywhere within the camera's field of view. Further, the camera movement is accomplished with a motor and pulley arrangement which is relatively expensive, subject to breakdown and maintenance.

Further, there would of necessity be some time lag between the operator's use of the motor control button and the movement of the camera. Accordingly, it is relatively difficult and time consuming for the user to place his image where desired. Since these booths typically have a relatively short time, for example ten seconds, for the user to place himself where desired in the camera's field of view, this motor driven vertical positioning system will not provide the means by which the user can exactly place his image in the camera's field of view. This is a severe problem in such photography booths in which the user selects a stored image into which his image is placed digitally to provide a fantasized picture of the subject; in such instances, it is imperative that the subject be placed at exactly the right position and at the right angle, with the correct intensity of lighting and shading, to exactly fit in the stored image so that the resulting picture looks as realistic as possible.

SUMMARY OF INVENTION

It is therefore an object of this invention to provide a camera positioning system which allows quick and accurate positioning of the subject's image in the camera's field of view.

It is a further object of this invention to provide such a system which employs mechanical linkages to alter the camera's field of view in two axes.

It is a further object of this invention to provide such a system which the camera is pivoted on vertical and horizontal axis to alter the field of view anywhere in the X-Y plane.

It is a further object of this invention to provide such a system in which the user can very accurately match his image to those in the preestablished image so that the resultant fantasy picture is very realistic.

It is a further object of this invention to provide such a system which allows a user to match image tone and shading by separately controlling brightness of two or more booth light sources.

This invention results from the realization that a truly effective camera positioning system may be accomplished with a mechanical device which translates the operator's movement of a locating device into pivoting movement of the camera in vertical and horizontal axes to allow the user to position his image quickly and accurately anywhere within the camera's field of view.

This invention features a mechanical camera position adjustment device which allows a user to adjust the relative position of a photography-booth camera to alter the position of the user's image in the camera's field of view. The adjustment device includes a camera mount for providing at least one of horizontal and vertical camera movement, a remote camera adjustment device operable by the user to move the camera, and a mechanical linkage between the adjustment mechanism and the camera mount for directly translating user adjustment device operation into camera movement to allow the user to directly control the camera position. In one embodiment, the camera mount provides for pivoting camera movement in a vertical and/or horizontal axis to provide horizontal and/or vertical camera adjustment, respectively. Alternatively, the camera mount may provide translational camera movement in one or both of the X and Y axes.

The remote camera adjustment device may be a steering mechanism such as a joystick or a wheel. The mechanical linkage may be a parallelogram linkage for translating rotational movement of the adjustment device into camera pivoting movement on a vertical axis, and adjustment device movement toward and away from the user into camera pivoting movement on a horizontal axis to provide the X-Y camera adjustment.

Preferably, the remote camera adjustment device includes means such as switches for operating the camera. There may be one or more switches for capturing the camera image to freeze the scene, and one or more switches for releasing the captured image to free the scene to allow the capture of a different image. Preferably, the camera is a CCD camera. Finally, the photography booth preferably includes at least two lights and the adjustment device has means such as dimmer switches for separately controlling the brightness of the two lights to allow the user to control the image tone and shading.

DISCLOSURE OF PREFERRED EMBODIMENT

Other objects, features and advantages will occur to those skilled in the art from the following description of a preferred embodiment and the accompanying drawings, in which:

FIG. 1A is a partial elevational view of a self-photography booth schematically depicting a camera adjustment system according to this invention;

FIG. 1B is a more detailed front elevational view of the control panel of a booth such as that shown in FIG. 1A;

FIGS. 3A through 3C are diagrammatic top plan views of the system of FIG. 2 showing the camera position and the resultant image position for lateral pivoting of the camera;

Figure 2:
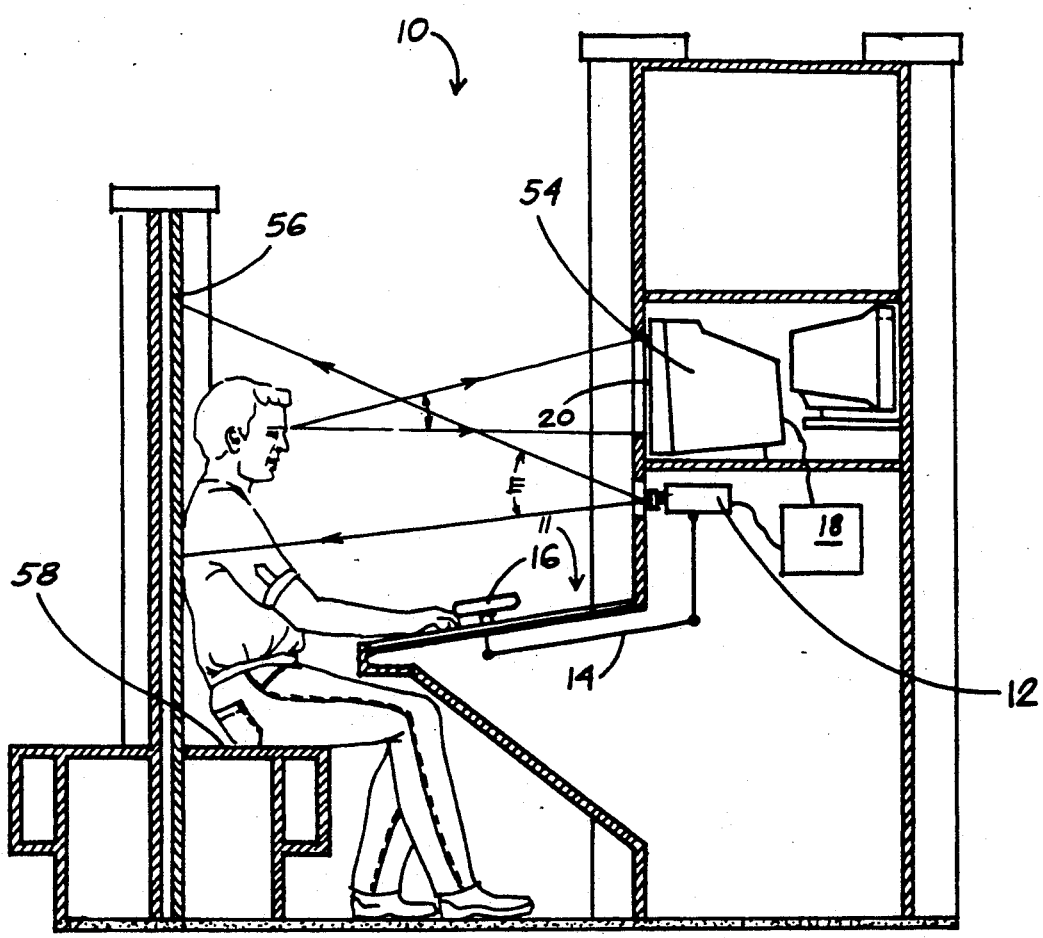
FIG. 2 is a diagrammatic view of one embodiment of the camera positioning system according to this invention.
Figure 2:
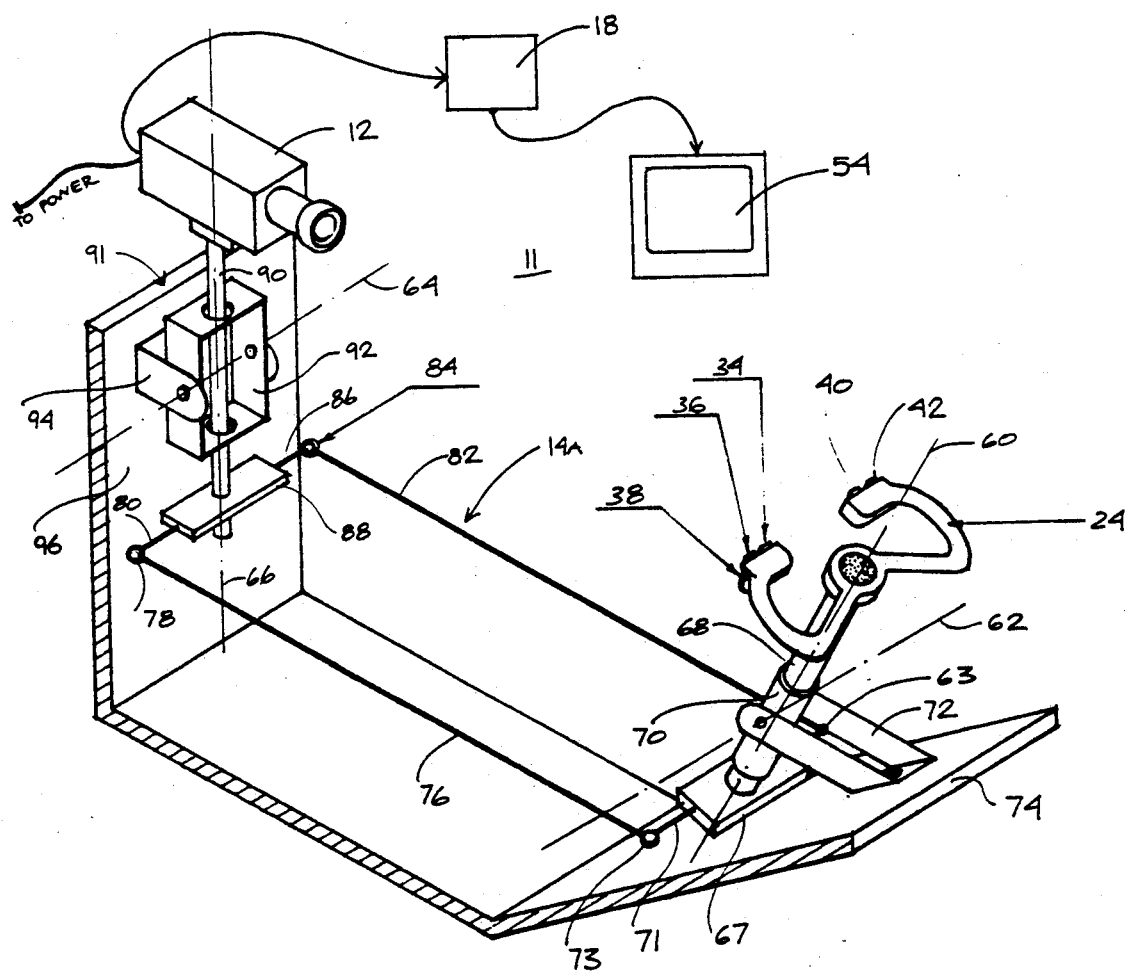

There is shown in FIG. 1A self-photography booth 10 including seat 58 and back 56 against which the user sits. Camera 12 having a field of view encompassing angle E is positioned to have within its image the head and shoulders of an average height user. The image from camera 12 is supplied to computer 18 and then to monitor 54 so the user can view his image. One type of such system includes a number of preestablished images digitally stored in the computer 18. These images have a space for insertion of the user's image. In such a case, the user typically selects one stored image, which then appears on screen 54 along with the user's image superimposed thereon. To properly position himself with respect to the selected image, the user must then physically move the proper portions of his body where desired in the scene, for example his head, shoulders, and one or more hands. This is difficult and awkward to do, and may be virtually impossible to accomplish in such booths in which there is relatively short time such as ten seconds between the time the image is selected and the time the user's image is captured and digitally superimposed on the prestored image, which are then together printed out in a photograph.

The mechanical positioning system according to this invention is schematically depicted by control lever 16 and mechanical linkage 14 connected between lever 16 and camera 12 for directly altering the position of camera 12 to change the camera's field of view to alter the position of the user's image in the scene on monitor 54. Accordingly, the camera position adjustment device according to this invention allows the user to directly and exactly control the camera position to accomplish the desired result.

Front panel 20 of booth 10 is shown in more detail in FIG. 1B. Video camera 12 is placed just below monitor screen 54. Booth lights 28 and 30 are provided for lighting the subject. Control panel 32 includes photographic samples of stored images 26, with a selection button next to each image so the user may select a stored image into which he desires to place his image. The user operates control 24, in this embodiment shown as a steering wheel, to alter the position of camera 12 to change its field of view to move the image of the user on monitor 54 as is further described below.

One embodiment of mechanical camera position adjustment device 11 according to this invention is shown in FIG. 2. The user operates remote camera adjustment device 24, which is linked to camera mount 91 by mechanical linkage 14a to directly translate the user's operation of adjustment device 24 into camera movement to allow the user to directly control the camera position in two axes to allow the user to place his image exactly where desired in the scene very quickly without any time lag associated with electronic drives. Further, since device 11 is directly responsive to the user's operation of wheel 24, the system is an intuitive adjustment device which is immediately operable by the user to quickly and exactly position his image where desired.

Steering wheel 24 is directly attached to shaft 68, which rotates on axis 60 within sleeve 70, which is itself pivotably attached to bracket 72 fixed to booth structure 74. Accordingly, wheel 24 can pivot about axis 60 to cause camera movement in one plane, and can pivot about axis 62 to cause camera movement in the other plane to provide X-Y adjustment of the camera to alter the camera's field of view.

Parallelogram linkage 14a interconnects mounting block 67 to camera mount 91 to directly translate the user rotational and translational movement of wheel 24 to adjustment of the camera position. In this embodiment, the camera is pivoted on vertical axis 90 and horizontal axis 64 to accomplish field of view movement in the X and Y axes, respectively. In an alternative embodiment, the camera mount may be adapted for translational movement in the X and/or Y axes to provide for the field of view adjustment.

Parallelogram linkage 14a includes sections 71 and 65, not shown, fixed to block 67 and having universal joints 73 and 63 at their ends, respectively, attached to linkage members 76 and 82, respectively. Universal joints 78 and 84 attach to members 80 and 86, respectively, fixed to block 88. Linkage 14a thus translates the rotational and translational motion of wheel 24 into rotation of camera 12 about axis 90 and 64, respectively, as detailed below in conjunction with FIGS. 3 and 4. Camera 12 is mounted to shaft 90 which is rotatably fixed in member 92 so that is may rotate on axis 64 to pan the camera left and right. Member 92 is pivotably mounted to member 94, which is itself fixed to wall 96 to allow member 92 to pivot on horizontal axis 64 to pan the camera up and down to provide the full range of camera movement in the X-Y plane to allow the user to directly position his image exactly where desired anywhere in the video scene.

FIGS. 3A through 3C depict schematically the horizontal panning of the camera that allows the user to place his image laterally in the scene on monitor 54. In the neutral position of steering wheel 24, field of view axis 100 of camera 12 is pointed directly at the customer, whose image appears in the middle of the scene on monitor 54. When the wheel is turned counterclockwise as shown in FIG. 3B, camera 12 pans in a counter clockwise direction to move the customer's image to the right in the scene to position the image in relation to digital image 55 supplied by computer 18. Digital image 55 is typically an image of a well known personality, for example. FIG. 3C depicts clockwise panning of camera 12 to move the user's image to the left to position the image on the other side of digital image 55.

Figure 4A:
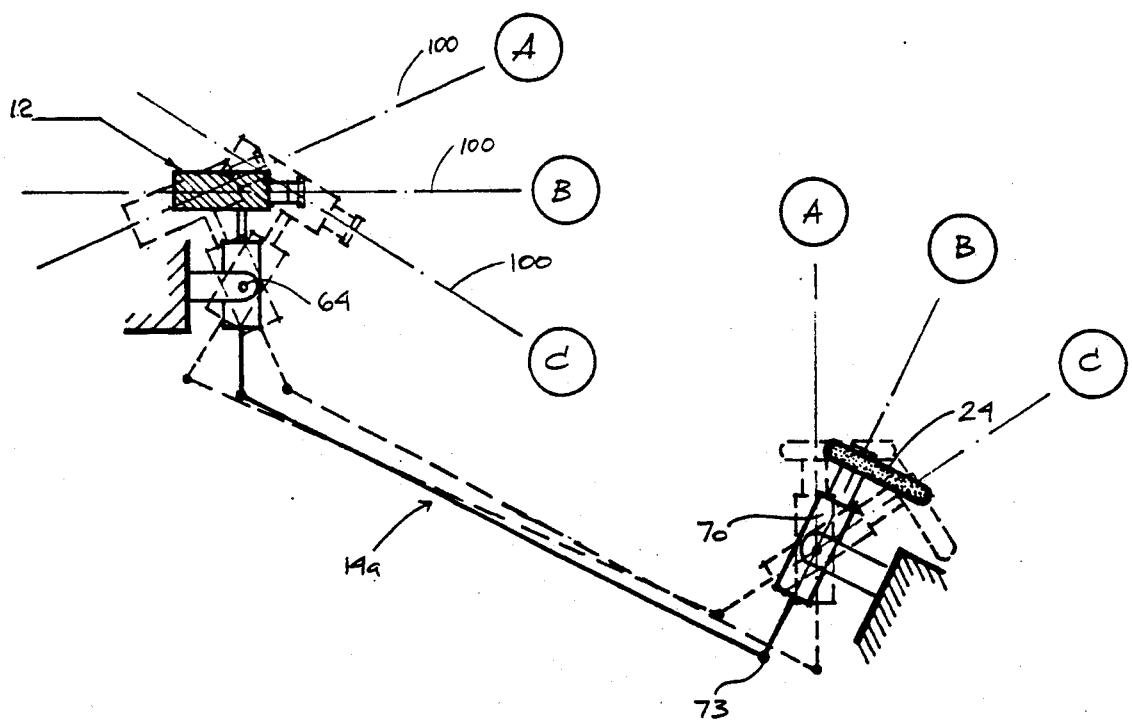
FIGS. 4A through 4D are diagrammatic side views of the system of FIG. 2 showing the vertical positioning of the camera and the resultant image positions.
Figure 4B:
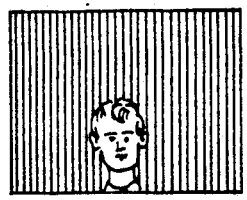
Figure 4C:
Figure 4D:

The rotation of the camera about a horizontal axis to accomplish the vertical panning of the camera is depicted in FIGS. 4A through 4D. As shown schematically in FIG. 4A, in the neutral position B of wheel 24, axis 100 of the field of view of camera 12 is in position B to center an average height customer's image in the scene as shown in FIG. 4C. When the wheel is pushed forward, or away from the user, to pivot member 70 into a more vertical position, linkage 14a is pulled down toward the user to pivot camera 12 on axis 64 to pan the camera up as shown by position A. This causes the user's image to move down in the scene as shown in FIG. 4B. The other extreme of vertical movement is shown in FIG. 4D, where the user's image is moved up in the scene by pulling wheel 24 back toward the user to pivot member 70 to a more horizontal position to shift linkage 14a away from the user to pivot camera 12 so that it pans down to accomplish the image shifting.

Figure 5:
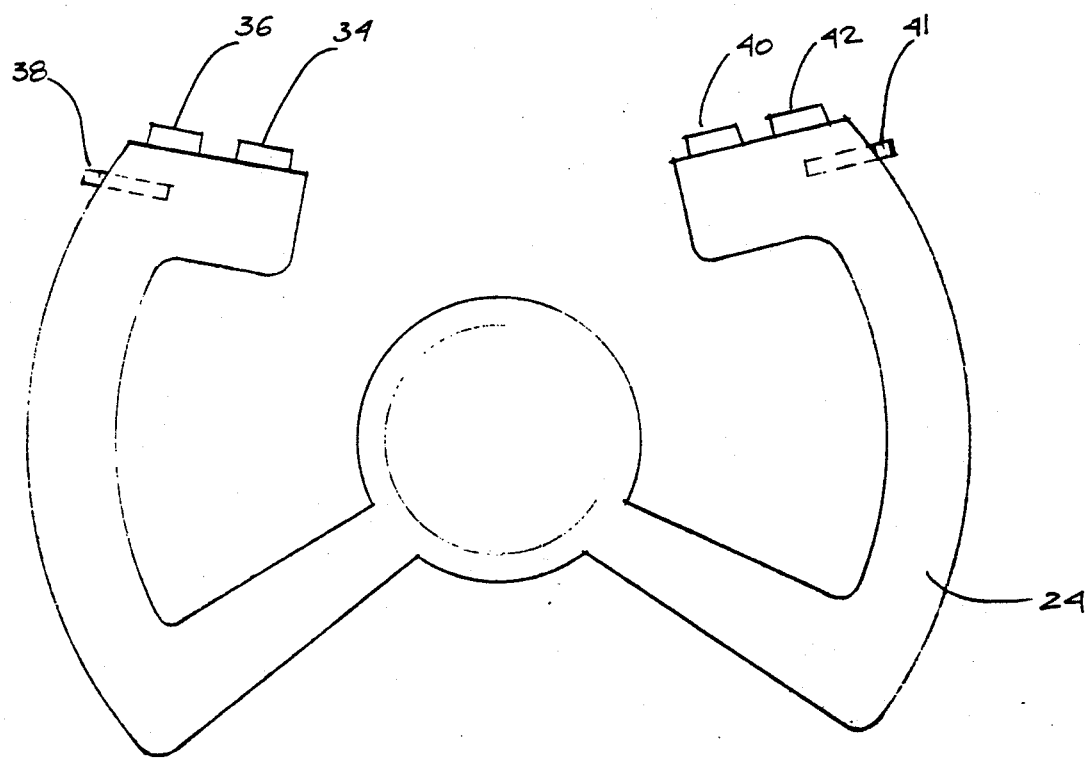
FIG. 5 is a top view of the control wheel of the system of FIG. 2 detailing the camera and light-level control switches.

A preferred embodiment of control wheel 24 is shown from the top in FIG. 5. Wheel 24 in this embodiment includes image freeze buttons 34 and 42 which freeze the user's image in the position at the time the button is depressed by capturing the image from camera 12 (typically a CCD camera) so that the user can study the position of his image before he pushes the print button to permanently capture the scene. Unfreeze buttons 36 and 42 are provided so that the user can free the image to allow him to reposition himself as desired before the picture is printed. Finally, light dimmer switches 38 and 41 are preferably rotatable dimmers with serrated wheels placed on the side or underside of wheel 24 so that they may be operated by one of the fingers of the left or right hand, respectively. Dimmer 38 controls the intensity of left light 28, FIG. 1B, and dimmer 41 controls the intensity of right light 30, FIG. 1B, to allow the user to closely match the tones and shading of his image to that of the digital image so that the user will appear to fit exactly into the stored scene so that the resultant picture looks very natural.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A mechanical camera position adjustment device for allowing a user to adjust the relative position of a photography-booth camera to altar the position of the user's image, comprising:
   a camera mounting including means for pivoting said camera on a vertical axis to provide horizontal field of view adjustment;
   a remote camera adjustment mechanism operable by the user to move the camera; and
   a mechanical linkage between said adjustment mechanism and said camera mount for directly translating user adjustment mechanism operation into camera movement to allow the user to directly control the camera position.

2. The camera position adjustment device of claim 1 in which said camera mount further includes means for pivoting said camera on a horizontal axis to provide vertical field of view adjustment.

3. The camera position adjustment device of claim 1 in which said camera mount provides translational camera movement.

4. The camera position adjustment device of claim 1 in which said remote camera adjustment mechanism includes a steering mechanism.

5. The camera position adjustment device of claim 4 in which said steering mechanism includes a joystick.

6. The camera position adjustment device of claim 4 in which said steering mechanism includes a wheel.

7. The camera position adjustment device of claim 1 in which said remote camera adjustment mechanism further includes means for operating the camera.

8. The camera position adjustment device of claim 7 in which said means for operating the camera includes means for capturing the camera image to freeze the scene.

9. The camera position adjustment device of claim 8 in which the camera is a CCD camera.

10. The camera position adjustment device of claim 9 in which said means for operating the camera further includes means for releasing the captured image to free the scene to allow capture of a different image.

11. The camera position adjustment device of claim 1 in which said mechanical linkage includes a parallelogram linkage for translating adjustment mechanism rotational movement into camera pivoting movement on one axis.

12. The camera position adjustment device of claim 11 in which said remote camera adjustment mechanism includes means for translating said parallelogram linkage toward and away from the user to provide camera pivoting movement on a second axis.

13. The camera position adjustment device of claim 1 in the photography booth includes at least two lights.

14. The camera position adjustment device of claim 13 further including means for separately controlling the brightness of said two lights to allow the user to control the image tone and shading.

15. A mechanical camera position adjustment device for allowing a user to vertically and horizontally adjust the image field of a photography-booth camera to alter the position of the user's image to allow the user to carefully place his image without having to move, comprising:
   a camera pivot mount for providing camera pivoting in two axes to adjust the camera image field horizontally and vertically;
   a remote camera adjustment mechanism movable by the user in a first direction to pivot the camera in one pivot axis and movable by the user in a second direction to pivot the camera in the other pivot axis; and
   a mechanical linkage between said adjustment mechanism and said camera mount for directly translating user adjustment mechanism operation into camera pivoting movement to allow the user to directly control the camera position.

* * * * *